United States Patent Office 3,692,670
Patented Sept. 19, 1972

3,692,670
TREATMENT OF CATION AND ANION EXCHANGE RESINS WITH SODIUM SULFITE
William C. Burns, Fullerton, and Donald Robinson, Arcadia, Calif., and Sidney H. Newberry, Caledonia, Ill., assignors to Water Treatment Corporation, City of Industry, Calif.
No Drawing. Continuation of application Ser. No. 775,529, Nov. 13, 1968. This application Dec. 29, 1969, Ser. No. 888,146
Int. Cl. B01d 15/06
U.S. Cl. 210—32
4 Claims

ABSTRACT OF THE DISCLOSURE

A method for purifying, reconditioning and separating mixtures of cation exchange resins and anion exchange resins which are contaminated with solid particles of ferric oxide and other metal oxides such as cupric oxide by contacting said mixture of exchange resins with a reducing agent which will reduce the ferric oxide to the ferrous state and form a water soluble ferrous salt and, if necessary, reduce the cupric oxide to the corresponding water soluble cuprous salt thereby easily removing said oxides. At the same time, the cation of the reducing agent as well as the ferrous ion substantially exhausts the cation exchange resin while the anion of the reducing agent substantially exhausts the anion exchange resin thereby creating a significant density differential between the anion and cation exchange resin so that said resins can be easily separated prior to regeneration.

This is a continuation of application Ser. No. 775,529, filed Nov. 13, 1968, now abandoned.

BACKGROUND OF THE INVENTION

Removing undesirable substances from liquids, particularly water, has been a problem since prehistoric times. However, as technology has grown more complex the need for purer and purer water has increased and the incumbent problems of producing pure water in relatively large quantities has correspondingly increased. In recent years, the removal of dissolved ions and certain solid particles contained in liquids such as water has been accomplished by passing the liquid through ion exchange resins. The dissolved ions in the liquid are removed by replacing said ions with ions contained in the ion exchange material whereas the solid particles are removed by a filtering action as the liquid passes through the ion exchange bed.

Ion exchange resins are basically of two types, cation exchangers and anion exchangers. Generally speaking, cation exchangers contain easily exchangeable hydrogen ions and remove the dissolved cations contained in the water while anion exchangers contain an easily exchangeable anion such as the hydroxyl group which is exchanged for dissolved anions in the liquid.

When the ion exchange resins are exhausted or substantially exhausted they can be regenerated by passing an acid such as sulfuric acid through the cation exchange resin and by passing a base such as sodium hydroxide through the anion exchanger.

When complete deionization is required it is the general practice to pass the solution to be deionized through a so-called mixed bed of ion exchange resin which is an admixture of an ion exchange resin and a cation exchange resin. In addition to removing all of the dissolved ions such treatment also removes solid particles by a filtering action.

The advent of highly efficient boilers and nuclear reactors has created another field for utilizing a mixed bed of ion exchanger. Prior to the development of such highly efficient boilers and nuclear reactors, condensate, which is condensed steam, and which is very pure water by conventional standards, was recirculated and utilized. However, the new highly efficient boilers cannot utilize conventional condensate because it contains trace amounts of metal oxides, primarily ferric oxide and, sometimes, cupric oxide, as well as silica and dissolved ions. Although the amount of such impurities is very small systems such as super-critical pressure boilers (in which there is no latent heat and all the water immediately turns to steam); drumless type boilers (in which there is no place to concentrate the solids); and nuclear reactors (in which trace amounts of contamination can cause considerable radiological problems) all require demineralization by passing the condensate through a mixed bed of anion exchange resin and cation exchange resin.

When silica is present in the condensate it is desirable to use a strong base anion exchanger in which the replaceable ion is the hydroxyl group. Most often the cation exchange resin has, as the replaceable ion, the hydrogen ion. However, as will be pointed out infra we prefer to utilize a cation exchange resin in the ammoniated form.

The normal apparatus for utilizing mixed bed of cation and anion exchange resins is to arrange a number of such mixed bed exchangers in parallel. After a certain end point is reached the resins are transferred to external regeneration facilities where the resins are usually cleaned by backwashing with water at a suitable velocity, alternating with drainage and air flow to produce scrubbing, and thereafter the resins are separated and regenerated.

Generally, the ion exchange resins are transferred for cleaning, separating and regeneration prior to the point at which the resins are exhausted (particularly the anion resins). When the resins are at such a stage it is very difficult to separate them successfully because separation depends upon a density differential between the two resins and, at this point, the density differential between the anion and the cation exchange resins is not very great. This is a significant problem because it is vitally necessary to successfully separate the two resins prior to regeneration.

In addition, the art has encountered difficulties in cleaning the resins of solid particles of metal oxides (particularly ferric oxide) which are trapped in the mixed resin bed.

It is thus a desideratum in the art to embody a method wherein metal oxides, particularly ferric oxide, can be easily removed from a mixed bed of ion exchange resins and to embody a method which will allow easy separation of the anion exchange resin from the cation exchange resin.

SUMMARY OF THE INVENTION

The primary object of the present invention, therefore, is to disclose and provide a method which easily removes undissolved metal oxide particles from a mixed bed of ion exchange resins, without the necessity of backwashing, and, at the same time, recondition the ion exchange resins so that they can be easily separated by normal methods in the art.

It is a further object of the present invention to embody a method wherein undissolved ferric oxide particles trapped within the mixed resin bed are reduced to form water soluble ferrous salts which are easily rinsed from the mixed resin bed.

It is still another object of the present invention to disclose and provide a method for exhausting the anion and cation exchange resins of a mixed resin bed in order to create a substantial density differential between the two resins and thereby make said resins easily separable from each other by stratification.

It is still another and further object of the present invention to embody a method wherein the anion exchange resin is purified after regeneration utilizing an ammonia solution which will also convert the cation exchange resin in the hydrogen form to the ammoniated form.

The foregoing objects, and others, are accomplished by the present invention which, generally stated, comprises the provision of a method for purifying, reconditioning and separating mixtures of cation exchange resins and anion exchange resins contaminated with solid particles of ferric oxide by utilizing a reducing agent which reduces the ferric oxide to a water soluble ferrous salt which is easily removed from the mixed ion exchanged bed and, at the same time, the reaction products of said reduction reaction are utilized to create a substantial density differential between the anion exchange resin and the cation exchange resin thereby making said resins easy to separate. After the two resins have been separated and regenerated to the hydrogen and hydroxyl forms the present invention provides for easily converting the hyrogen form of the cation exchange resin to the ammoniated form and, at the same time, removing impurities from both the cation and anion exchange resins by first contacting the anion exchange resin with an ammonia solution and, thereafter, contacting the cation exchange resin with the same ammonia solution.

DESCRIPTION OF THE PREFERRED EMBODIMENTS

The purifying, reconditioning and separating method of this invention can be applied to a mixture of any cation and anion exchange resins, such resins being well-known in the art. It is presently preferred that the anion exchange resin utilized will be of the strong base type in the hydroxyl form (e.g. a copolymer of styrene with divinylbenzene and vinylethylbenzene which has been treated with chloromethyl ether).

Any cation exchange resin can be treated in accordance with the method of our invention such as a sulfonated copolymer of divinylbenzene and styrene. The cation exchange resins can be in the hydrogen form but when the mixed bed resin is to be utilized to demineralize condensate from boilers and the like it is preferred that the cation resins be in the ammoniated form. This can be accomplished by means well-known in the art such as by passing a solution of ammonium hydroxide through the cation exchange resin when it is in the hydrogen form.

A presently preferred embodiment of the present invention is in the purification, reconditioning and separation of a mixed bed of cation and anion exchange resins intended to be utilized for demineralizing condensate from boiler feed cycles. This condensate, even before treatment with the mixed bed of ion exchange resins, is quite pure; therefore, small amounts of oxygen bring about unfavorable pH conditions which causes excessive corrosion of unlined steel surfaces which are prevalent in the boiler feed water cycles. Hence, it is common practice to treat the condensate with ammonia, hydrazine, or other ammonia-type compounds to elevate the pH. When this occurs, an ammonium ion is present in the condensate. If the hydrogen form of the cation exchange resin is utilized in the mixed bed the ammonium ion is removed from the condensate and replaced by the hydrogen ion of the cation exchange resin. This prematurely exhausts the cation exchange resin and, in addition, raises the pH of the condensate thus making it necessary to add more ammonia after demineralizing with the mixed bed ion exchange resins. If the ammoniated form is used the ammonia is not removed from the condensate.

In the presently preferred embodiment the mixed bed of ion exchange resins is composed of approximately equal amounts of admixed anion exchange resin in the hydroxyl form and ammoniated cation exchange resin. The mixture of cation and anion exchange resins are in cylindrical tanks (a mixed bed exchanger), the construction of the tanks being well-known in the art. See e.g. U.S. Pat. 3,385,-787. A number of mixed bed exchangers are arranged in parallel so when the resins need to be regenerated the system does not have to be shut down. In the presently preferred embodiment means are provided for transferring the exhausted resins to external regeneration facilities where the resins are separated, regenerated, rinsed and remixed. The remixed resins are then placed in a resin storage tank and, when necessary, returned to one or more of the mixed bed exchangers.

Typically, the mixed bed exchanger, when being utilized to demineralize boiler condensate, is installed just down stream of the condensor hot well which is utilized for replenishing the small amount of water lost in the cycle. In any event, the condensate is passed through, and in intimate contact with, the mixed bed of resins. The mixed bed filters out the undissolved particles of metal oxides, typically ferric oxide and sometimes cupric oxide, from the condensate. In addition, the mixed bed removes all of the dissolved ions in the condensate except for the ammonium ion.

After the cation and anion exchange resins have reached a certain designated end point, the condensate is introduced to another mixed bed exchanger and the anion and cation exchange resins are transferred to external regeneration facilities which may include a separating tank (which can also be the cation regeneration tank), an anion regeneration tank, and a storage and remixing tank. At the point where the resins are transferred the anion resin is far from being exhausted and therefore is primarily in the hydroxide form whereas the cation is exhausted about to the ammonia end point. This, as noted before, makes the resins very difficult to separate.

After the resins have reached the external separating tank an aqueous solution (preferably a dilute solution, e.g. 1–5%) of a water soluble reducing agent is introduced into the mixed bed and the solution is passed through the mixed bed and in intimate contact with the anion and cation exchange resins.

Any reducing agent can be utilized which is oxidizable by ferric oxide so that the anion of the reducing agent and the ferrous ion (formed from the reduction of the ferric ion) form a water soluble ferrous salt. If cupric oxide is also present in the condensate it will also have been removed by the mixed bed of resin and therefore the mixed bed of resin is contaminated both with ferric oxide and cupric oxide. If this occurs, it is contemplated that the reducing agent will not only reduce the ferric oxide to the corresponding water soluble ferrous salt but also reduce the cupric oxide to the corresponding water soluble cuprous salt.

Examples of reducing agents which are useful in our invention are alkali metal and alkaline earth metal salts of sulfite (e.g. sodium sulfite). The sodium sulfite is dissolved in water in an amount to make up a 1–2% solution which is then passed through the mixed bed of ion exchange resins so that the ferric oxide and the cupric oxide are reduced to form ferrous sulfate and cuprous sulfate.

At the same time, the sulfate ion which is formed exhausts the anion exchange resin while the sodium ion from the reducing agent exhausts the cation exchange resin. When all of the resins are exhausted or when all of the metallic oxides (the ferric oxide and, if present cupric oxide) are dissolved, whichever occurs last, the introduction of the solution of sodium sulfite is discontinued and the mixed bed is then rinsed to remove the sodium sulfate therefrom as well as any dissolved ferrous sulfate or cuprous sulfate which may remain in the resin bed.

As noted before, any aqueous solution of a water soluble reducing agent can be utilized in treating a mixed bed of anion and cation exchange resins if the anion of the reducing agent can be oxidized by ferric oxide to form a water soluble ferrous salt and if the reducing agent also contains a metal ion, preferably an alkali metal or alkaline earth metal. In addition to those exemplified above, reducing agents which meet the foregoing criteria are the alkali metal and alkaline earth metal salts of thiosulfite.

After rinsing of the conditioned mixed bed of ion exchange resins the anion exchange resins and the cation exchange resins are separated utilizing the density differential between the two resins. This can be accomplished by methods known in the art but preferably the two resins are hydraulically separated. After separation, the anion resin is on top of the cation resin and, preferably, the anion resin is transferred to a different tank for regeneration.

While in separate tanks the cation resin is regenerated by flowing an acid such as sulfuric acid either downwardly or upwardly through the resin for a sufficient amount of time to change the resin completely to the hydrogen form. Thereafter, the sulfuric acid is rinsed from the resin and disposed of in the usual manner.

At the same time the anion resin is regenerated to the hydroxyl form by passing a base such as caustic soda through the resin either upwardly or downwardly. As with the case of the cation resin, the anion resin is rinsed of regeneration solution (the caustic soda) when the anion resin is completely in the hydroxyl form.

After both resins have been regenerated so that they are in the hydrogen and hydroxyl form a solution of ammonia (a 1-2% ammonium hydroxide solution) is first passed through the anion exchange resin and then the cation exchange resin to flush out impurities in the anion exchange resin and to convert the cation exchange resin from the hydrogen form to the ammonium form. The ammonium treatment can be either accomplished while the resins are in separate tanks or after the resins have been transferred into a single tank providing, in the latter instance, that the resins are in separate layers so that the ammonium solution can first pass through the anion exchange resin.

After the resins have been ammoniated, they are then mixed together and ready to be transferred to one of the mixed bed exchangers.

The embodiments described supra exemplified methods wherein the mixed bed of cation exchange resin and anion exchange resin conditioned in accordance with our invention was utilized in demineralizing boiler condensate. However, our invention can be used to purify, recondition and separate any type of mixed bed resins, whatever the end use of the resins may be.

It will be understood that the foregoing description is only illustrative of the present invention and it is not to be limited thereto. Many other forms of apparatus, reducing agents, ion exchange resins, etc. will be apparent to the skilled in the art and all substitutions, alterations and modifications of the present invention which come within the skill of the appended claims or to which the present invention is readily susceptible without departing from the spirit and scope of this disclosure are considered a part of the present invention.

We claim:
1. A method of purifying, reconditioning and separating mixtures of cation exchange resins and anion exchange resins which have been utilized to demineralize boiler condensate and which are contaminated with ferric oxide, silica, and solid particles contained in boiler condensate which comprises introducing an aqueous reducing solution containing sodium sulfite into a zone containing a mixed bed of cation exchange resin and anion exchange resin and passing said reducing solution through said zone in intmate contact with said mixed bed thereby reducing the ferric oxide to a water soluble ferrous sulfate, the sulfate substantially exhausting the anion exchange resin and the cation of the reducing agent substantially exhausting the cation exchange resin thereby causing a significant density differential between the anion and cation exchange resins, discontinuing introduction of said reducing solution into said zone when the exchange resins are substantially exhausted and substantially all of the ferric oxide is reduced to the water soluble ferrous salt form and hydraulically separating said anion exchange resin from said cation exchange resin.

2. A method according to claim 1 wherein the cation exchange resin is in the ammoniated form.

3. A method according to claim 1 wherein after separation of the anion and cation exchange resins the cation exchange resin is regenerated by passing an acidic solution therethrough in intimate contact with said cation exchange resin and the anion exchange resin is regenerated by passing an alkali solution therethrough in intimate contact with said anion exchange resin and, thereafter, passing an ammonia solution through the anion exchange resin and thence, through the cation exchange resin to convert the cation exchange resin from the hydrogen form to the ammoniated form and to remove any trace of impurities from both the cation exchange resin and anion exchange resin.

4. In a method for demineralizing boiler condensate and removing ferric oxide, silica, and solid particles contained in said boiler condensate including the steps of passing said boiler condensate through a mixed bed of anion exchange resin and cation exchange resin whereby dissolved ions and solid particles contained in said boiler condensate are removed and said solid particles are trapped in the mixed bed of exchange resins, and, thereafter, cleaning said mixed bed of exchange resins of said solid particles, and reconditioning and separating the mixed bed of exchange resins, the improvement comprising removing said solid particles by passing through the mixed bed of exchange resins an aqueous solution of sodium sulfite until the cation exchange resin is substantially exhausted, discontinuing introduction of said reducing solution into said zone and hydraulically separating said anion exchange resin from said cation exchange resin.

References Cited

UNITED STATES PATENTS

| | | |
|---|---|---|
| 2,692,244 | 10/1954 | Kunin et al. |
| 2,995,522 | 8/1961 | Joyce. |
| 3,078,224 | 2/1963 | Schultze et al. |
| 3,139,401 | 6/1964 | Hach. |
| 3,255,106 | 6/1966 | Reid et al. |
| 3,385,787 | 5/1968 | Crits et al. |
| 3,414,508 | 12/1968 | Applebaum et al. |
| 3,429,807 | 2/1969 | Burgess _____ 210—33 X |
| 3,262,876 | 7/1966 | Hronas et al. _____ 210—37 X |

REUBEN FRIEDMAN, Primary Examiner

T. G. WYSE, Assistant Examiner

U.S. Cl. X.R.

210—37, 38